United States Patent [19]

Camiade et al.

[11] Patent Number: 5,319,802
[45] Date of Patent: Jun. 7, 1994

[54] DEVICE FOR THE EXCHANGE OF DATA BY ELECTROMAGNETIC WAVES

[75] Inventors: Marc Camiade, Antony; Véronique Serru, Paris; Dominique Geffroy, Courcouronnes, all of France

[73] Assignee: Thomson Composants Microondes, Puteaux, France

[21] Appl. No.: 792,918

[22] Filed: Nov. 15, 1991

[30] Foreign Application Priority Data

Nov. 16, 1990 [FR] France .................................. 9014289

[51] Int. Cl.[5] .............................................. H04B 1/40
[52] U.S. Cl. ...................................... 455/85; 455/78;
455/54.1; 331/51; 331/117 FE
[58] Field of Search .................. 329/301, 305; 331/51,
331/117 FE, 117 R; 342/42, 50, 51;
340/825.54; 307/490, 497; 455/73, 74, 78, 84,
85, 86, 88

[56] References Cited

U.S. PATENT DOCUMENTS

| | | | |
|---|---|---|---|
| 2,989,745 | 6/1961 | Carroll | 455/85 |
| 3,673,590 | 6/1972 | Corvi et al. | 340/554 |
| 3,918,057 | 11/1975 | Van Tol | 342/51 |
| 3,925,774 | 12/1975 | Amlung | 340/553 |
| 4,173,016 | 10/1979 | Dickson . | |
| 4,609,882 | 9/1986 | Gehring et al. | 331/117 R |
| 4,672,379 | 6/1987 | Bishop | 455/85 |

FOREIGN PATENT DOCUMENTS

| | | |
|---|---|---|
| 0199162 | 10/1986 | European Pat. Off. . |
| 0343034 | 11/1989 | European Pat. Off. . |
| 2387458 | 11/1978 | France . |
| 2636187 | 3/1990 | France . |
| 2203313 | 10/1988 | United Kingdom . |

OTHER PUBLICATIONS

Toshiba Review, No. 155, Spring 1986, pp. 19-23, Tokyo, M. Ohyama, et al., "Toshiba Programmablee Identification System, Tospid".
Toshiba Review, No. 155, Spring 1986, pp. 19-23, Tokyo, M. Ohyama, et al.,"Toshiba Programmable Identification System, Tospid".
Cyrogenics, vol. 28, No. 1, Jan. 1988, pp. 32-35, S. I. Cho, et al.,"Cryogenic UHF FET Oscillator for Magnetic Resonance Detection".

Primary Examiner—Reinhard J. Eisenzopf
Assistant Examiner—Nguyen Vo
Attorney, Agent, or Firm—Oblon, Spivak, McClelland, Maier & Neustadt

[57] ABSTRACT

In order to increase the sensitivity and range of a system for the exchange of data by microwaves between a fixed station, or reader, and a mobile station, or badge, the modem of the badge includes an oscillator. A single transistor works, under a first bias, as a detector of the wave transmitted by the reader and demodulates this wave, and then, under a second bias, it works as an oscillator and modulates the response transmitted by the badge. Applications to the exchange of data at a distance.

8 Claims, 2 Drawing Sheets

DEVICE FOR THE EXCHANGE OF DATA BY ELECTROMAGNETIC WAVES

BACKGROUND OF THE INVENTION

1. Field of the Invention

The present invention relates to a system of transmission by modulation-demodulation of a microwave, for two-way communication between a fixed station, called a beacon or reader, and a mobile station, called a badge or responder. More precisely, the invention relates to the modem (modulator-demodulator) of the portable badge, said modem including an oscillator which enables the badge to be active in transmission and active in reception. This means that several badges of a meshed network organized around a fixed station can exchange data.

This type of data exchange can be applied to the control of moving bodies, for example in the identification of wagons on a railroad, automobiles at a toll-gate or pedestrians at the entrance to a building. The mobile station or badge takes the form of a chip card, and it has to be extremely economical in energy for it is supplied by small cells known as "buttons".

2. Description of the Prior Art

The general diagram of a system for the exchange of data by microwave electromagnetic radiation, according to the prior art, is fairly simple and FIG. 1 which represents it enables its elements and the abbreviations used to be specified.

A mobile station or badge 1 includes a microwave part 3, an information processing part 4 and a supply 5. The exchanges among these two parts relate to the operation of modulation/demodulation and to the transmission/reception commands.

The fixed station or beacon 2 includes a microwave source, a microwave part 6, an information processing part 7 and a computer 8 which enables the management of all the radioelectrical exchanges carried out with the badges, by means of an antenna 9 for each badge and an antenna 10 for each beacon or reader.

The following values will be used:
d = distance between the antennas 9 and 10,
$G_l$ = gain of the antenna 10 of the reader 2
$G_b$ = gain of the antenna 9 of the badge 1
$P_{li}$ = power transmitted at the antenna of the reader 2
$P_{lr}$ = power received by the antenna of the reader
$P_{bi}$ = power transmitted at the antenna of the batch 1
$P_{br}$ = power received by the antenna of the batch The modulations used in these systems are generally of the OOK (on-off keying . amplitude modulation) type or of the PSK ($0/\pi$ phase-shift keying, phase modulation) type.

The working of the modem differs, depending on whether the beacon interrogates the badge or whether the badge responds to the beacon.

In the mode in which the badge 1 is interrogated by the reader 2, the reader 2 generates ($P_{li}$) a modulated microwave signal. The badge receives this signal ($P_{br}$) and demodulates it: it is a step that enables the activation of the badge which has been in the vigil state.

In the mode in which the badge 1 is responding to the reader 2, the reader generates a non-modulated microwave signal. The badge receives this signal, modulates it, i.e. loads it with the information on which it has been interrogated and re-transmits a signal comprising, as the case may be, either losses or gain.

Indeed the badge may be:
passive in transmission, i.e. the power it transmits being always lower than the power it receives ($P_{bi}P<P_{br}$), and the energy being given to it by the reader.
or active in transmission, i.e. including a microwave amplifier ($P_{bi}>P_{br}$), which therefore assumes a supply source such as cells.

There are therefore problems of energy consumption at least on the badge side, that are equivalent to the problems of obtaining the sensitivity of the badge in the vigil state, hence under conditions of very low power consumption, obtaining the sensitivity of the reader, and problems of parasitic phenomena contributed by other systems working at a near frequency.

But, in addition, a badge even if it includes an amplifier can communicate only with a reader: there is no communication possible among badges.

SUMMARY OF THE INVENTION

The invention consists notably in introducing a microwave oscillator into the modem of the badge. This changes the conditions of operation of the data exchange system and further enables badges to converse with one another, since a badge provided with an oscillator can become a reader for another badge.

More precisely, the invention relates to a system for the exchange of data by electromagnetic waves between a fixed station, called a reader, and a mobile station, called a badge, each of these two stations including at least one modem, or modulator/demodulator, connected to a transmission/reception antenna of said data, said system being one wherein at least the badge includes an oscillator in its modem.

BRIEF DESCRIPTION OF THE DRAWINGS

The invention will be understood more clearly from the following more detailed description, made with reference to the appended figures, of which.

MORE DETAILED DESCRIPTION

As a rule, the condition necessary for the transmission from the reader to the badge to be operational is that the power received by the badge $P_{br}$ should be greater than the minimum power $P_{br\ min}$ that triggers the demodulation circuit of the badge:

$$P_{br} = P_{li} \cdot G_l \cdot G_b \cdot \left(\frac{\lambda}{4\pi d}\right)^2 > P_{br\ min}$$

with $\lambda$ = wavelength.

In the same way, the condition necessary for the transmission from the badge to the reader to be operational is that the power received by the reader $P_{lr}$ should be greater than the minimum power $P_{lr\ min}$ that triggers the demodulation circuit of the badge:

$$P_{lr} = P_{li} \cdot G_l^2 \cdot G_b^2 \left(\frac{\lambda}{4\pi d}\right)^4 \cdot G_{mod} > P_{lr\ min}$$

with $G_{mod}$=loss or gain provided by the badge during the modulation in a standard example.

The sensitivity of the demodulator of the reader is far greater than that of the demodulator of the badge, but the problems of consumption are not the same, since the reader is a fixed station which can easily be supplied.

For example, for a prior art device with the following characteristics:

$G_1$=15 dB
$P_{li} \cdot G_1$=27 dBm (maximum power permitted by French law);
$G_b$=6 dB
$G_{mod}$=3 dB for a badge passive in transmission= +6 dB for a badge active in transmission=
d=10 meters
the minimum sensitivities in dBm are:

| Frequency | | 2.45 GHz | 9.9 GHz |
|---|---|---|---|
| For the badge | | −27 | −39 |
| For the reader | Passive badge | −69 | −93 |
| | Active badge | −60 | −84 |

The circuit proposed by the invention makes it possible to obtain greater sensitivity of the badge with, as regards the badge, very low consumption (some microamperes).

According to the invention, the microwave modem of the badge has a microwave (1 to 100 GHz range) oscillator, which means that the badge can transmit information independently of the reader.

In the information exchanges between the reader and the badge, the presence of an oscillator in the badge changes nothing in the interrogation stage: the reader generates an amplitude modulated frequency signal, and the badge demodulates this signal: at least one transistor works as a demodulator.

In the response stage, from the badge towards the reader, the reader no longer transmits any signal but is in a position of demodulation. It is the badge which, through its oscillator, transmits a modulated signal. The type of modulation which is the simplest to use is amplitude modulation: at least one transistor works as an oscillator. However, phase modulation can also be used.

The microwave function of the modem may be fulfilled by means of only one transistor, preferably a field-effect transistor that works either as a demodulator or as an oscillator, depending on its point of bias.

Figure 2:
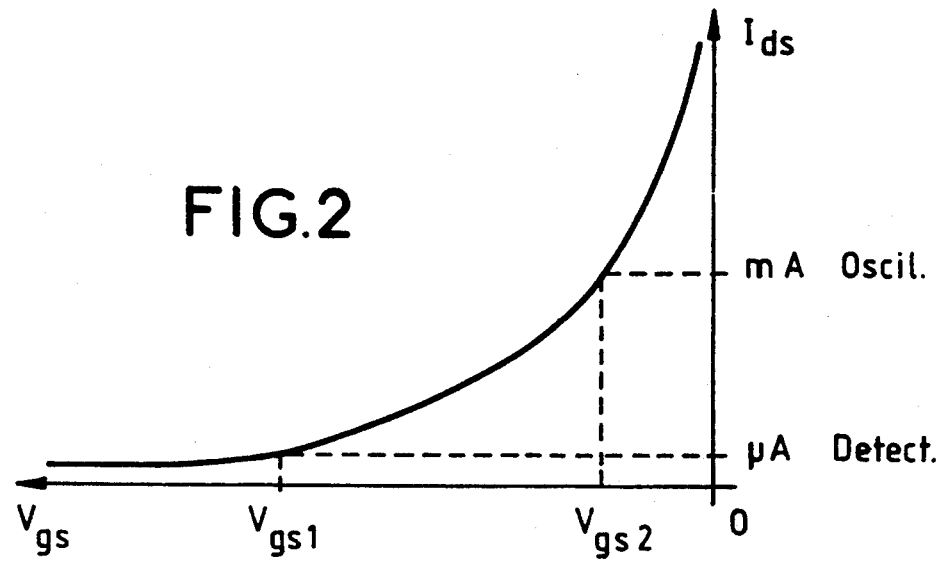
FIG. 2 shows a curve $I_{ds}=f(V_{gs})$ of the transistor used in the badge according to the invention.

FIG. 2 shows the static characteristic curve I-V for a field effect transistor for which $I_{ds}$ is the drain-source current and $V_{gs}$ is the gate-source current.

When the transistor is biased on the gate at $V_{gs}=V_{gs1}$, the current $I_{ds}$ is of the order of some milliamperes, and its non-linear characteristic curve enables the rectification of the drain current generated by a microwave voltage at the gate. Since the transistor is biased on the drain at $V_{dso} \approx 3$ volts, high detection sensitivities are obtained. These sensitivities are greater than those obtained with Schottky diodes. Under these conditions, the transistor is used as a level detector, or demodulator: it detects the interrogation signal transmitted by the reader.

When the transistor is biased on the gate at $V_{gs}=V_{gs2}$, the current $I_{ds}$ is of the order of some milliamperes. The transistor is used as an oscillator, by the insertion of a feedback loop into the circuit at the chosen frequency. The amplitude modulation is achieved either by the drain bias or by the gate bias.

The transistor is in oscillation in a state that shall be called 1 if $V_{gs} = V_{gs2}$
and $V_{ds} = V_{ds0}$ with $V_{ds0}$=bias voltage at midpoint of the static characteristic curve.

The transistor is stable and shall be called 0:

if $V_{gs} = V_{gs2}$
and $V_{ds} = 0$
or if $V_{gs} = V_{gs3}$
and $V_{ds} = V_{ds0}$ with $V_{gs3}$=gate bias voltage for which the transistor is stable.

The phase modulation is achieved also by switching over the biases, to make the transistor work as an oscillator but, furthermore, by modulating the line length between the antenna and the gate of the transistor, by means of a phase modulator which is known per se.

It is thus seen that the introduction of a transistor working sometimes as a demodulator and sometimes as an oscillator enables the making of a badge that is highly sensitive to detection (and consumes little power) and is furthermore capable of communicating with other badges since it transmits its modulated signals itself.

Figure 3:
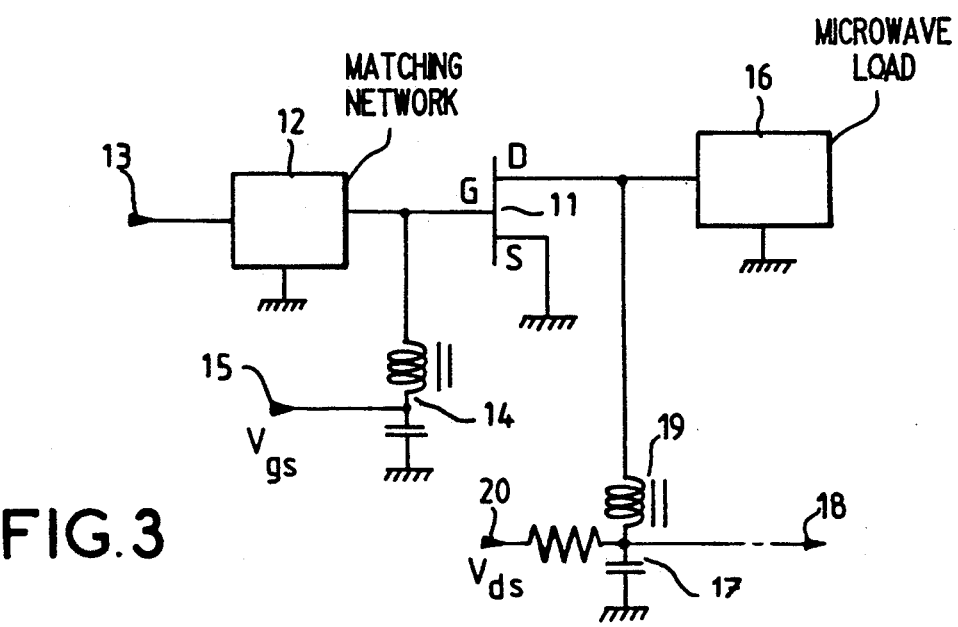
FIG. 3 shows a simplified electrical diagram of the badge according to the invention.

FIG. 3 shows the basic diagram of the demodulator-oscillator circuit according to the invention.

The transistor 11, mounted as a common source, has its gate connected by a matching network 12 to the input 13 of the circuit (which is, in practice, the single transmission/reception antenna 9). A filter 14 is placed at input 15 of the gate bias voltage $V_{gs}$. The drain of the transistor is loaded with a microwave load 16 in parallel with a low-pass filter 17 which gives an output 18 in modulation or demodulation mode depending on the use being made of the transistor 11. A filter 19 is placed at input 20 of the drain bias voltage $V_{ds}$.

Figure 1:
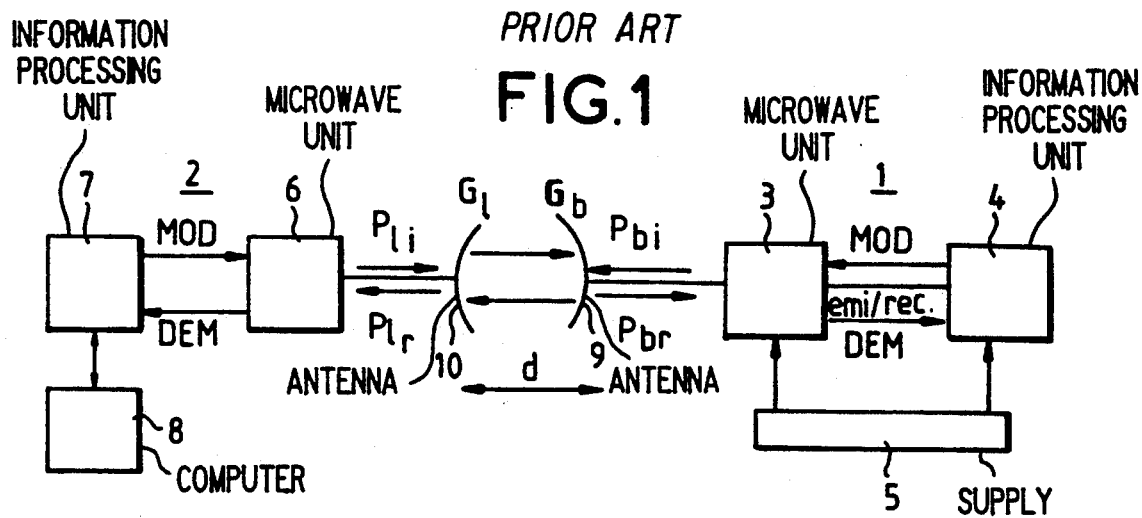
FIG. 1 shows a general block diagram of data exchanges, by microwave links. This figure, explained in the introduction relating to the prior art, remains valid for the invention.
Figure 4:
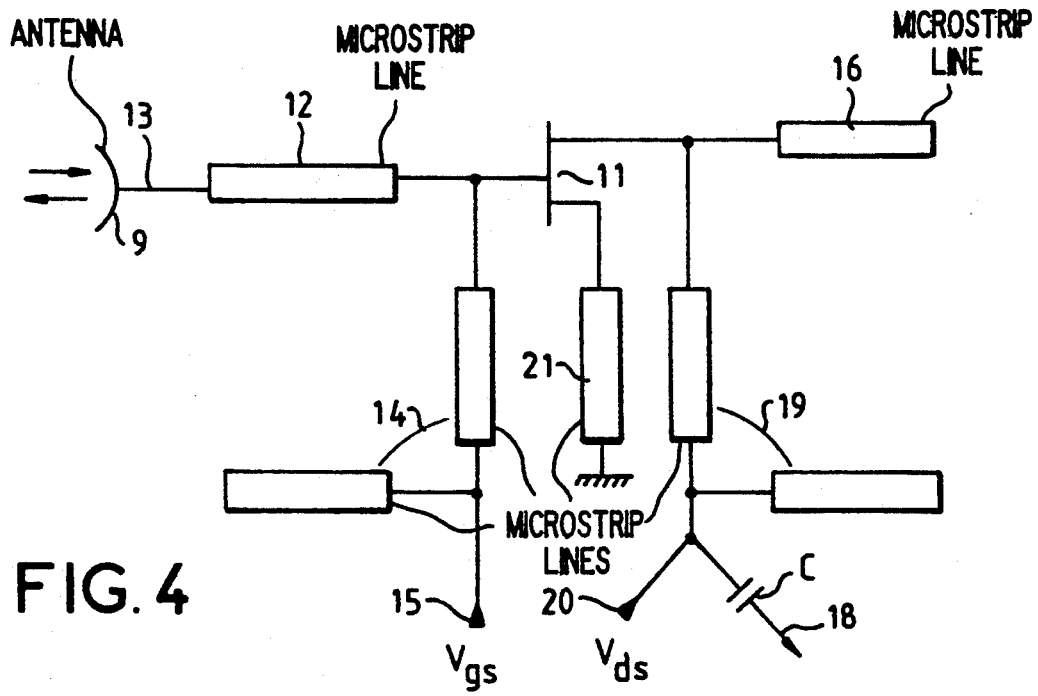
FIG. 4 is a diagram showing an embodiment, using microstrip lines, of the circuit of FIG. 3.

This very general diagram can be achieved by means of different technologies. FIG. 4 gives the diagram of the microwave part 3 of FIG. 1, in the example of a hybrid embodiment with a discrete transistor and microstrip lines.

By comparison with the previous figure, the microstrip lines 12 and 16 are impedance matching loads for coupling between the transistor 11 and the input 13, in both types of operation, modulation and demodulation. On the source, the microstrip line 21 constitutes the feedback loop of the transistor 11 and gives the conditions of oscillation. The two lines 14, on the gate, and the two lines 19, on the drain, all have quarter-wave length, and provide for the decoupling of the bias voltages. The input 15 receives the gate bias $V_{gs}$ but also constitutes the demodulator/modulator switching means. To go from one to the other, i.e. to respond to an interrogation from the reader 2, the signal processing part 4 of the badge sends the corresponding bias $V_{gs1}$ or $V_{gs2}$ or $V_{gs3}$. The input 20 receives the drain bias $V_{ds}$ that is appropriate for the transistor 11 to be a demodulator or a modulator: in the latter case, the modulation signals coming from the information processing part 4 are injected by this input 20. The demodulated signals output 18 is connected to the processing circuit 4.

Figure 5:
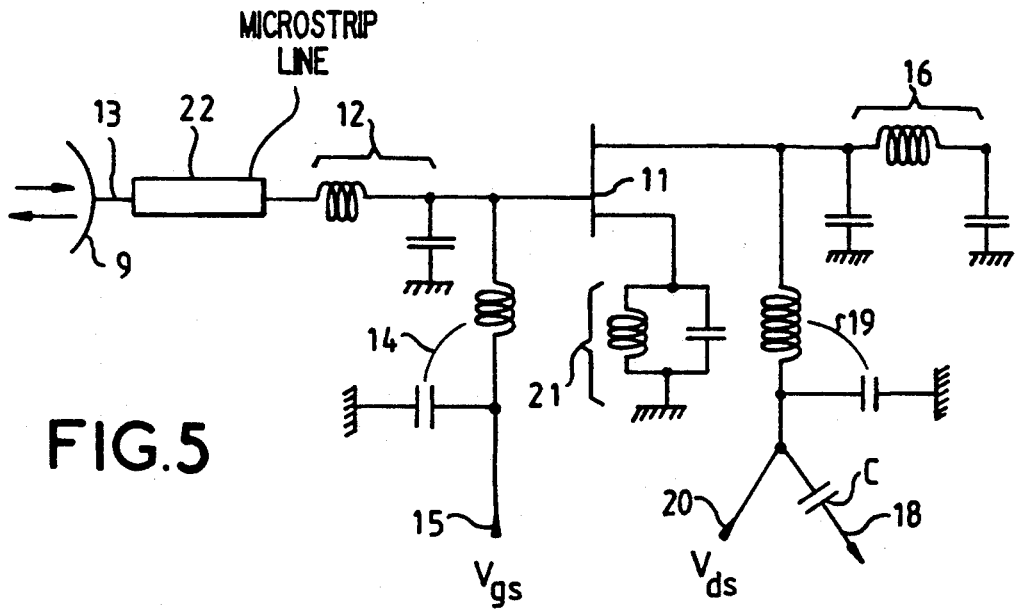
FIG. 5 is a diagram showing an embodiment, in integrated circuit form, of the circuit of FIG. 3.

FIG. 5 shows a diagram equivalent to that of the previous figure, in the example of an embodiment in integrated circuit form: the integrated circuit chip has to be attached to a semi-insulator substrate that has a microstrip line 22 for matching with the antenna at the input 13.

The inductors and capacitors take up far less space, on the chip of the integrated circuit, than the microstrip lines of a hybrid embodiment. Those skilled in the art will be able to establish the correspondence between the embodiments of FIGS. 4 and 5 without any difficulty.

In these two figures, C is a decoupling capacitor that enables the elimination of the DC component at the demodulation output 18.

Figure 6:
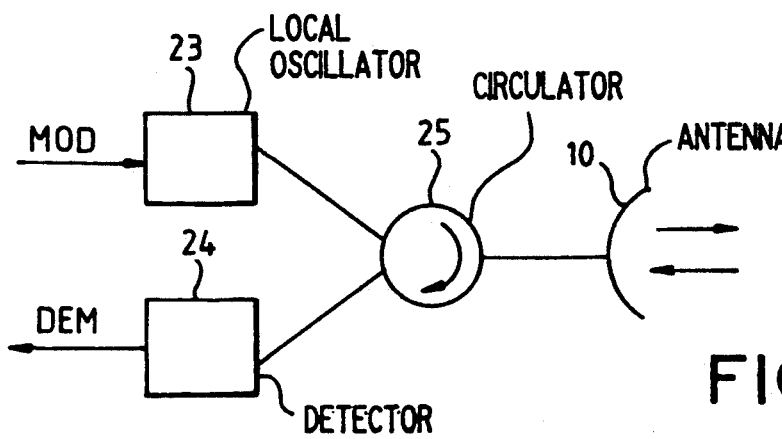
FIG. 6 is a functional diagram of the reader, or interrogation beacon, according to the invention.

The microwave part 6 of the reader 2, shown in FIG. 6, is simpler to make for it is not subject to the same imperatives of economy as the badge 1. It has:
- a local oscillator 23, the output power of which is capable of being modulated, to interrogate a badge,
- a direct detector 24 that demodulates the signal transmitted by the badge. This approach is far simpler than that of the prior art, according to which a non-modulated signal, transmitted by the reader, is retransmitted by the badge.
- a circulator 25 which orients either of the transmission/reception channels towards the antenna 10.

This scheme in which the functions are separated performs excellently. However, the diagrams of FIGS. 4 and 5 can also be used to make the reader. It is then possible to associate an antenna with it, having a fairly high gain (of 15 to 25 dB) depending on the application.

The system proposed by the invention enables communication among badges independently of the reader since each of them has an oscillator and is capable of transmitting information sequences. However, owing to the problem of the range of the badges, related to the "button" cells that supply them, and also owing to the gain of the antenna, these exchanges are limited in space to short distances, sometimes of a few meters.

The comparison of the results obtained with those obtained according to the prior art, referred to here above and under the same operating conditions, shows the promising character of the invention.

| GHz frequencies | 2.45 | 9.9 |
|---|---|---|
| Min. sensitivity of the badge in dBm | −27 | −39 |
| Min sensitivity of the reader in dBm | −40 | −52 |

The gain in sensitivity of the reader is 20 dB at 2.45 GHz and 32 dB at 9.9 GHz, thus enabling the communications system to work more easily in a disturbed environment.

What is claimed is:

1. A system for the exchange of data by electromagnetic waves between a fixed station and a mobile station, each of said fixed and mobile stations including at least one modulator/demodulator, connected to an antenna for the transmission/reception of said data, wherein at least said mobile station includes a transistor in said at least one modulator/demodulator thereof which, under a first gate bias voltage, works as a detector of a modulated electromagnetic signal transmitted by the fixed station and, under a second gate bias voltage, works as an oscillator for transmitting a modulated electromagnetic signal to said fixed station, wherein the first gate bias voltage corresponds to a low drain current and the second gate bias voltage corresponds to a high drain current.

2. A system according to claim 1, wherein the transistor is connected to the antenna by its gate through a matching network, and the source of said transistor is coupled directly to ground potential.

3. A system according to claim 2, wherein the electromagnetic signal transmitted by the mobile station to the fixed station is amplitude modulated.

4. A system according to claim 2, wherein the electromagnetic signal transmitted by the mobile station to the fixed station is phase modulated.

5. A system for the exchange of data by electromagnetic waves between a fixed station and a mobile station, each of said fixed and mobile stations including at least one modulator/demodulator connected to an antenna for the transmission/reception of said data, wherein at least said mobile station includes a transistor in said at least one modulator/demodulator thereof which, under a first gate bias voltage, works as a detector of a modulated electromagnetic signal transmitted by the fixed station and, under a second gate bias voltage, works as an oscillator for transmitting a modulated electromagnetic signal to said fixed station, said transistor being connected to the antenna by its gate through a matching network and wherein said mobile station further includes a circuit for processing signals which provide bias voltages to said transistor for switching the transistor between a first position in which the transistor works as the detector and a second position in which the transistor works as the oscillator wherein the first gate bias voltage corresponds to a low drain current and the second gate bias voltage corresponds to a high drain current.

6. A system according to claim 1, wherein the electromagnetic waves used between the fixed station and the mobile station are in the range of 1 to 100 GHz.

7. A system according to claim 1, wherein said mobile station can exchange data with another mobile station.

8. A system according to any of the claims 1 to 7, wherein the mobile station has a "credit card" format.

* * * * *